United States Patent [19]

Kurtz

[11] 4,238,103
[45] Dec. 9, 1980

[54] MIRROR MOUNTING BRACKET

[76] Inventor: Thomas D. Kurtz, 1101 First Ave., Rock Falls, Ill. 61071

[21] Appl. No.: 955,355

[22] Filed: Oct. 27, 1978

[51] Int. Cl.³ ............................................. F16M 13/00
[52] U.S. Cl. ..................................... 248/544; 248/488
[58] Field of Search ................... 248/260, 272, 295 A, 248/295 B, 478, 488, 490, 496, 544

[56] References Cited

U.S. PATENT DOCUMENTS

| | | | |
|---|---|---|---|
| 2,532,162 | 11/1950 | Goss | 248/488 X |
| 2,696,962 | 12/1954 | Goss | 248/488 X |
| 2,931,612 | 4/1960 | Graber | 248/295 B X |
| 3,237,898 | 3/1966 | Goss | 248/488 X |
| 3,550,894 | 12/1970 | Kaplan | 248/488 X |
| 3,749,349 | 7/1973 | Kaplan | 248/488 |
| 3,962,266 | 9/1972 | Jacobs | 248/490 X |
| 3,989,217 | 11/1976 | Friedman | 248/295 B X |

FOREIGN PATENT DOCUMENTS 1214797  12/1970  United Kingdom ..................... 248/544

Primary Examiner—William H. Schultz
Attorney, Agent, or Firm—Morsbach & Pillote

[57] ABSTRACT

A mirror mounting bracket including a stationary bracket member adapted for attachment to a wall and a movable bracket member having an integral mirror engaging hook. The bracket members each have a generally rectangular body portion and guides along opposite sides of the body portions slidably supporting the movable bracket member on the stationary bracket member with the body portions laterally spaced apart to provide a cavity therebetween. A spring member is positioned in the cavity crosswise of the path of movement with end portions of the spring attached to one bracket member and an intermediate portion engaged by the other bracket member to progressively distend the spring member in response to relative movement between the bracket members. The stationary bracket member has a screw receiving aperture in the body portion and can be directly mounrted on a wall surface. In an alternate embodiment, the stationary bracket member has flanges engageable with the side edges of an elongated mounting strip to enable adjustment of the bracket along the strip.

13 Claims, 11 Drawing Figures

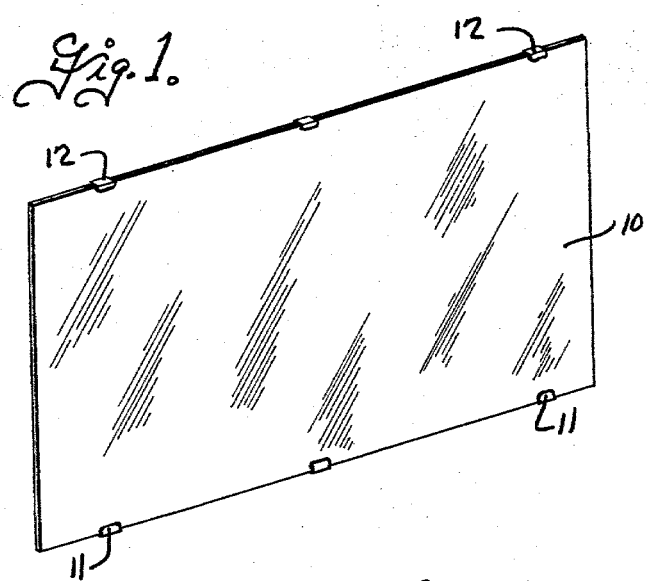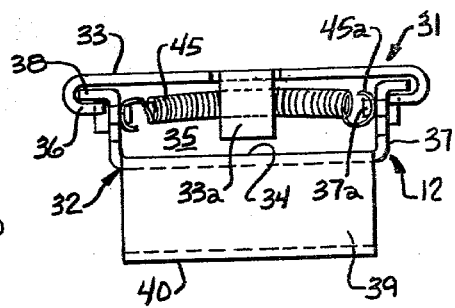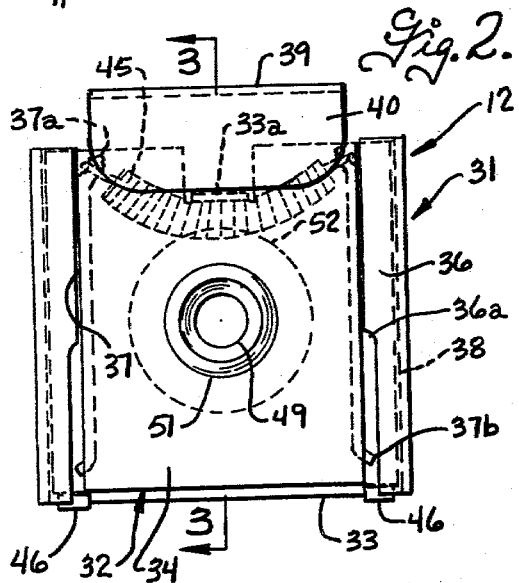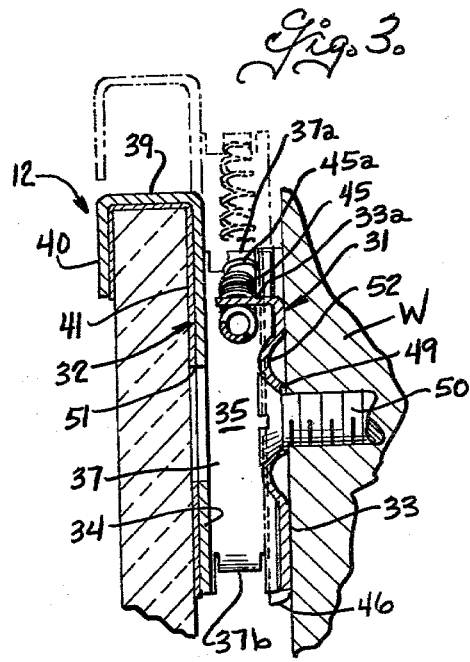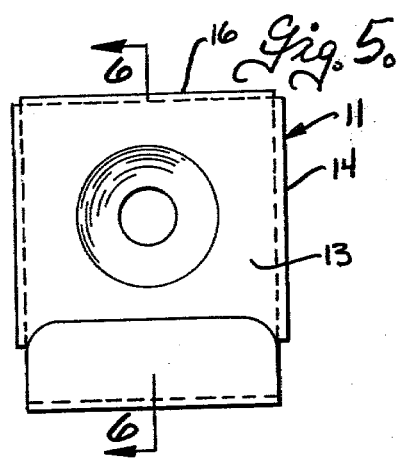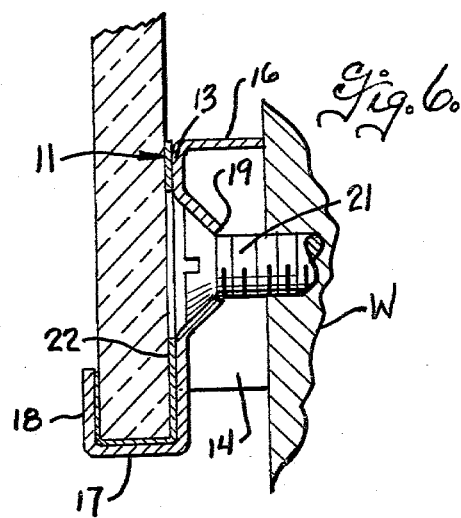

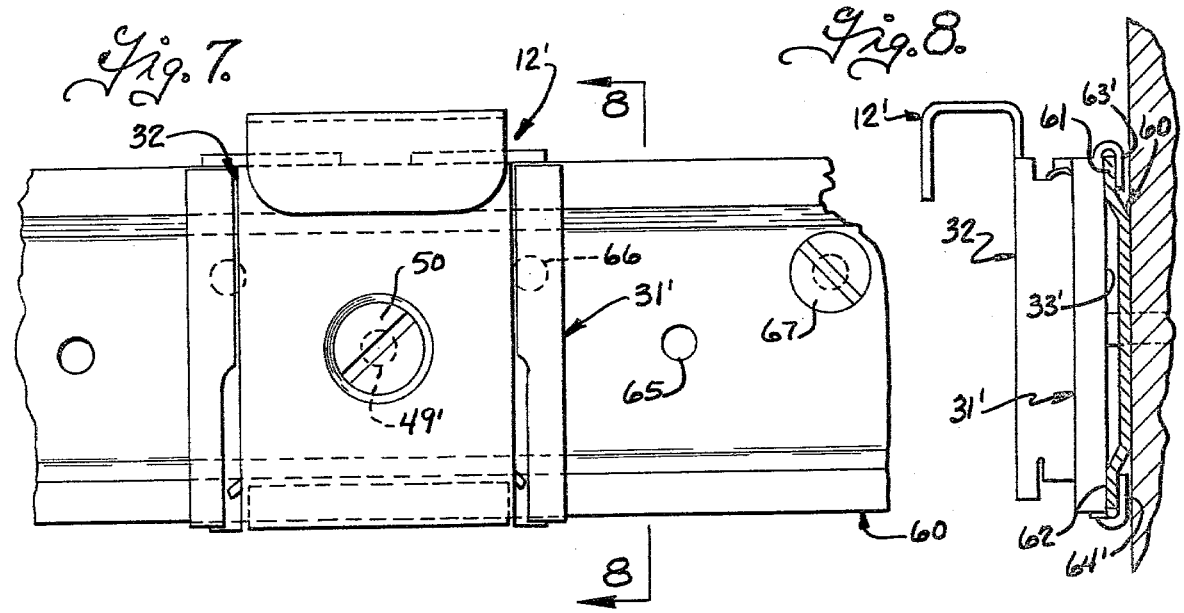
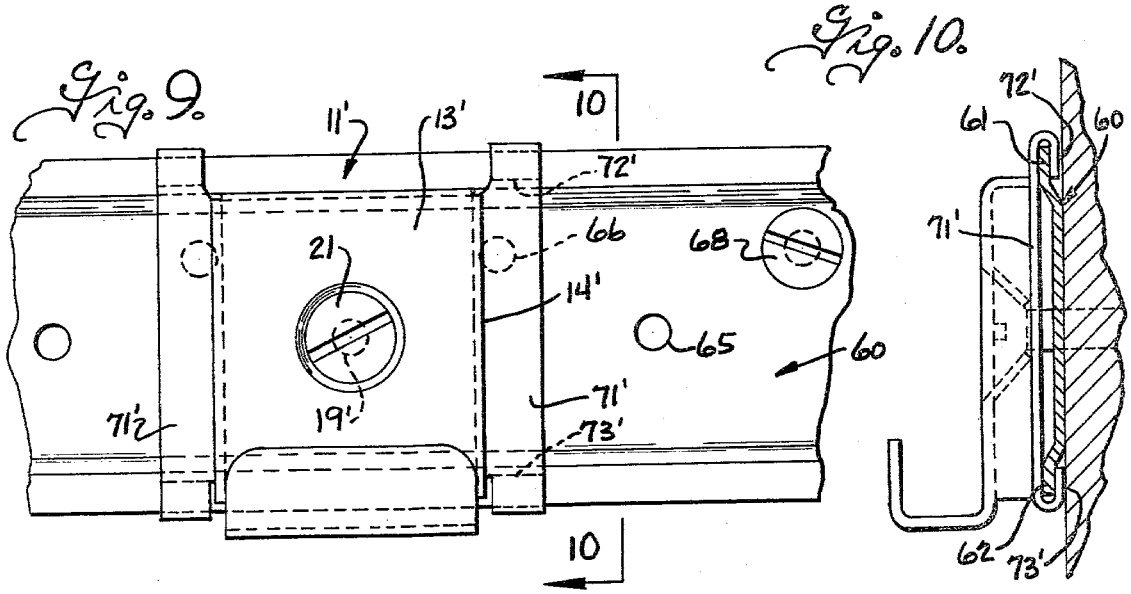
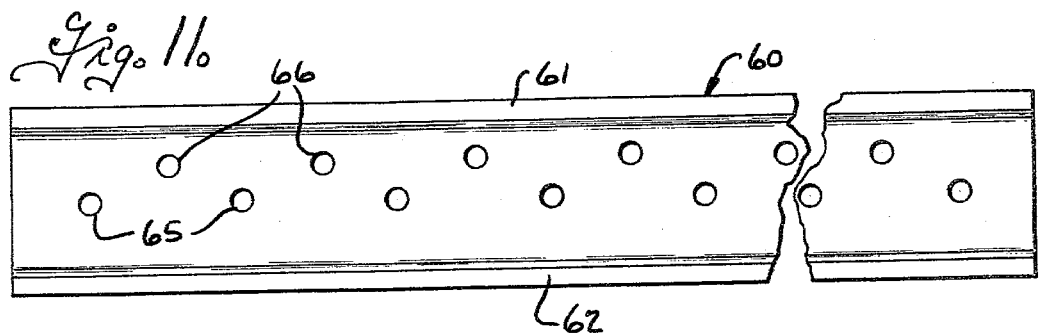

MIRROR MOUNTING BRACKET

BACKGROUND OF THE INVENTION

It is common practice to mount glass mirrors and the like on the wall using brackets having hooks that engage the edge of the mirror and various different brackets having adjustable mirror engaging hooks have heretofore been proposed. The adjustable type hooks commonly have a stationary bracket member that is adapted for attachment to a wall and a movable bracket member that is slidable relative to the stationary bracket member. Some adjustable brackets such as shown in U.S. Pat. Nos. 2,532,162 and 3,237,898 utilize a ratchet type arrangement for holding the movable bracket member in adjusted positions relative to the stationary member. Some other mirror mounting brackets such as shown in U.S. Pat. Nos. 3,550,894 and 3,749,349 utilize a single tension spring that extends lengthwise of the path of movement of the movable bracket member to yieldably urge the latter into its mirror engaging position. Still another adjustable mirror clip utilized a pair of coil type compression springs that are laterally spaced apart so that a mounting fastener could be inserted through an opening in the stationary bracket member at a location between the springs.

SUMMARY OF THE INVENTION

Various objects of this invention are to provide a mirror mounting bracket of the type in which the mirror engaging hook is spring biased into engagement with the mirror, and which bracket utilizes only a single spring member so arranged that the stationary and movable bracket members and spring member can be easily assembled; in which the forces applied to the movable bracket member by the spring are so arranged as to substantially avoid tilting or cocking of the movable bracket member as it moves along the stationary bracket member; and in which the biasing spring does not interfere with the mounting screws for attaching the bracket to a wall.

Accordingly, the present invention provides a bracket for mounting an article such as a mirror on a supporting surface and which includes a stationary bracket member adapted for attachment to a wall and a movable bracket member having an integral mirror engaging hook, the bracket members each having a generally rectangular body portion and interfitting guides along opposite side edges of the body portions supporting the bracket members for relative sliding movement along a path paralleling the body portions with the body portions laterally spaced apart to provide a cavity therebetween, a spring member positioned in the cavity crosswise of the path and having end portions attached to one of the bracket members and a tab on the body portion of the other bracket member engaging the spring member intermediate its ends and arranged to progressively distend the spring member when the movable bracket member is moved from a first to a second position. The body portion of the stationary bracket member has a screw receiving aperture substantially medially between the side edges and spaced from the spring member and the movable bracket member has an opening dimensioned to allow the head of the screw to pass therethrough and adapted to register with the aperture in stationary bracket member in one position of the movable bracket member.

Another object of this invention is to provide an improved arrangement for attaching a mirror mounting bracket to a wall in such a manner as to allow the mirror bracket to be adjusted horizontally to different positions along the wall.

These, together with other features and advantages of this invention will be more readily understood by reference to the following detailed description, when taken in connection with the accompanying drawings wherein:

FIG. 1 is a perspective view of a mirror attached to a wall by means of a plurality of mirror mounting brackets;

FIG. 2 is a front elevational view of a spring biased mirror mounting bracket embodying the present invention;

FIG. 3 is a vertical sectional view taken on the plane 3—3 of FIG. 2 and illustrating the spring biased mirror mounting bracket installed on a wall;

FIG. 4 is a top plan view of the mirror mounting bracket of FIG. 2;

FIG. 5 is a front view of a fixed mirror mounting bracket;

FIG. 6 is a vertical sectional view taken on the plane 6—6 and showing the mirror mounting bracket of FIG. 5 installed on a wall;

FIG. 7 is a fragmentary front elevational view illustrating a spring biased mirror mounting bracket embodying the present invention and having a modified wall mounting means;

FIG. 8 is a vertical sectional view taken on the plane 8—8 of FIG. 7;

FIG. 9 is a front elevational view of a fixed mirror mounting bracket having a modified wall mounting means;

FIG. 10 is a transverse sectional view taken on the plane 10—10 of FIG. 9; and

FIG. 11 is a front elevational view of a wall mounting strip for use with the brackets of FIGS. 7 and 9.

FIG. 1 shows a mirror 10 mounted on a wall by a plurality of mirror mounting brackets. The weight of the mirror rests on the lower mirror mounting brackets and it is customary to use two or more lower mirror mounting brackets 11 in which the mirror engaging hooks are fixed vertically in relation to the wall mounting portions of the bracket. The upper mirror brackets designated 12 are arranged so that the hook portions are adjustable relative to their mounting portions into and out of engagement with the edge of the mirror. The lower mirror mounting brackets 11 shown at FIGS. 5 and 6 are of a known construction and include a generally rectangular body portion 13 having rearwardly extending side flange portions 14 and a top flange portion 16 and a mirror engaging hook at the fronts including a forwardly extending mirror support flange 17 and an upwardly extending mirror retaining lip 18 spaced from the front side of the body portion 13 a distance sufficient to accommodate the thickness of the mirror. A screw receiving aperture 19 is provided in the body portion 13 and the body portion is preferably formed with a depression or recess 20 to receive the head of the screw 21, as best shown in FIG. 6. As is known in the art, a liner 22 (FIG. 6) formed of thin fiber board or the like is provided along the front side of the body portion 13 and along the inner sides of the support flange 17 and retainer lip 18 to inhibit chipping of the mirror. As shown in FIG. 6, the lower mirror mounting bracket 11 is adapted to be attached directly to the wall W by the screw 21 with the rear edges of the flanges 14 and 16 engaging the wall. The hook portion of the lower mirror mounting bracket is fixed with relation to its wall mounting portion to support the weight of the mirror and to laterally retain the lower edge of the mirror in position.

One aspect of the present invention relates to an improved upper mirror mounting bracket 12 in which the mirror engaging hook is mounted for movement relative to its mounting portion and is spring biased into engagement with the edge of the mirror. Referring now more specifically to FIGS. 2–4, the upper mirror mounting bracket 12 includes a stationary bracket member 31 adapted for attachment to a wall and the movable bracket member 32 which is adapted for engagement with the mirror. The stationary bracket member 31 includes a generally flat rectangular body portion 33 and a movable bracket member 32 includes generally flat rectangular body portion 34. Guides are provided along opposite side edges of the body portions 33 and 34 to support the bracket members for relative sliding movement along a path paralleling the body portions with the body portions laterally spaced apart to provide a cavity 35 therebetween. In the preferred embodiment illustrated, the body portion 33 of the stationary bracket member 31 has in-turned flanged portions 36 along opposite side edges which provide relatively parallel inwardly opening guide grooves at the front side of the body portion 33. The movable bracket member 34 has lateral flange portions 37 along opposite side edges which extend rearwardly from the body portion 34 and out-turned flange portions 38 along the rear edges of the lateral flange portions 37. The out-turned flange portions 38 are disposed generally parallel to the body portion 34 of the movable bracket member and are guidably received in the guide grooves formed by the in-turned flanges 36 on the stationary bracket member to slidably support the movable bracket member on the stationary bracket member with the body portions 33 and 34 laterally spaced apart as best shown in FIGS. 3 and 4. A mirror engaging hook is formed integrally with the front body portion 34 of the movable bracket member and includes a forwardly extending flange portion 39 at the upper edge of the body portion 34 and a depending lip portion 40 at the forward edge of the flange portion 39 and spaced from the body portion 34 a distance sufficient at least to accommodate the thickness of the mirror. A protective liner 41 (FIG 3) is conveniently formed of thin fiber board or the like is preferably provided and arranged to extend along the front face of the body portion 34 and along the inner side of the flange 39 and lip 40 to inhibit chipping of the edges of the mirror.

The movable bracket member is spring biased relatively to the stationary bracket member in a direction to urge the hook portion of the movable bracket member into engagement with the edge of the mirror. In accordance with the present invention, a single spring member 45 is utilized and is positioned in the cavity 35 to extend crosswise of the path of movement of the movable bracket member relative to the stationary bracket member. The spring member has its end portions attached to one of the bracket members and a tab is provided on the other bracket member for engaging the spring member intermediate its ends to progressively distend the spring member when the movable bracket member is moved in one direction relative to the stationary bracket member. Spring member 45 preferably comprises a coil type spring having end loops 45a that engage ears 37a formed on the laterally extending flange portions 37. Ears 37a are conveniently formed by notching the ends of the flange portions and, as shown in FIG. 2, the ears are preferably offset inwardly slightly relative to the flange portions 37 so that the end loops on the springs do not interfere with sliding movement of the movable bracket member relative to the stationary bracket member. A tab 33a is provided on the body portion 33 of the stationary bracket member and arranged to engage the spring 45 intermediate its ends. Tab 33a is conveniently formed by notching the body portion 33 and bending the tab forwardly as shown in FIGS. 2 and 4. The spring 45 is advantageously located adjacent the upper end of the bracket member so as to avoid interfering with the wall mounting means described hereinafter, and the tab 33a overlies the upper side of the spring intermediate its ends so that the spring is distended in a direction crosswise of its length when the movable bracket member is moved upwardly from the solid line position shown in FIG. 3 to the dotted line position shown in that Figure. The spring thus yieldably biases the movable bracket member in a downward direction to move the mirror engaging hook into engagement with the edge of the mirror. A stop means is provided to limit downward movement of the movable bracket member relative to the stationary bracket member and, as shown, this stop means comprises tabs 46 formed on the lower edge of the body portion 33 and which tabs are bent forwardly toward the lower ends of the in-turned flanges 36 to underlie the lower ends of the flanges 38 and limit downward movement of the movable bracket member to a fixed lower position shown in FIGS. 2 and 3. The tab 33a on the stationary bracket member is offset below the ears 37a on the movable bracket member a distance such that the spring is distended crosswise of its length to some degree when the movable bracket member is in its lowermost position so that the movable bracket member is yieldably biased into engagement with the edge of the mirror in all operative positions of the movable bracket member. A second stop means is advangageously provided to limit upward movement of the movable bracket member relative to the stationary bracket member, to prevent excessive distention of the spring. As best shown in FIG. 2, the in-turned flange portions 36 on the stationary bracket member are cut away at their lower edges to provide a shoulder 36a intermediate their ends and tabs 37b are provided at the lower ends of the flanges 37 and arranged to engage the shoulders 36a when the movable bracket reaches a preselected upper position, for example as shown in phantom in FIG. 3, to limit upward movement of the movable bracket member. Tabs 37b are conveniently formed by notching the lower edges of the flanges 37 and bending the lower ends of the flanges 37 outwardly as shown in FIG. 2.

The stationary bracket member 31 is adapted for attachment to a wall W and has a screw receiving aperture 49 formed in the body portion 33 substantially immediately between the opposite side edges of the body portion and at a location spaced below the spring 45. The screw receiving aperture 49 is adapted to receive the shank of the screw 50 while retaining the head of the screw. In order to allow installation of the screw, the movable bracket member 32 has an opening 51 formed in the body portion 34 of a size to pass the end of the screw and at a location to register with the aperture 49 when the movable bracket member is in its lowermost position as shown in FIG. 2. Thus, the screw can be inserted through the opening 51 in the movable bracket member and through aperture 49 in the stationary bracket member for threading into the wall. If flat head type screws 50 are utilized, a boss 52 (FIG. 3) is advantageously formed in the body portion 33 around the aperture 49 to receive the beveled underside of the flat head screw.

Large mirrors are quite heavy, and when installing large mirrors it is desirable to anchor the mirror mounting brackets on the studs in the wall. However, the studs are frequently not located at the positions where it is desired to mount the mirror mounting brackets. An improved arrangement for attaching the mirror mounting brackets to a wall is illustrated in FIGS. 7-11. Like numerals are used to designate corresponding parts of the mirror mounting brackets 11 and 12 and like numerals followed by the postscript ' are used to designate modified parts. In the embodiment of FIGS. 7-11, the upper and lower mirror mounting brackets are attached to the wall by means of elongated metal strips 60 which are adapted to be attached to the wall at locations corresponding to stud locations, and the mirror mounting brackets are slidable along the strips 60 to enable positioning of the brackets at the desired positions for mounting a mirror. In order to provide further support, provision is also made for securing the mirror mounting brackets through the strips directly to the wall.

Referring now more specifically to FIGS. 7-11, the mounting strips 60 are formed of metal of a suitable gauge to provide adequate strength and are preferably formed with edge portions 61 and 62 that are offset forwardly from the body of the strip 60 as best shown in FIGS. 8 and 10. The upper bracket members 12' shown in FIGS. 7 and 8 are similar to the bracket members 12 and conveniently utilize the same movable bracket members 32. The stationary bracket member 31', however, is modified by the addition of in-turned flanges 63' and 64' at the upper and lower edges of the body portion 33' arranged to provide upper and lower inwardly opening grooves at the rear side of the stationary bracket member to slidably receive the edge portions 61 and 62 on the strip. In this manner, the upper bracket members 12' can be moved horizontally along the strip 60 to enable positioning of the mirror mounting brackets at the desired location. The mounting strips 60 have a plurality of screw receiving apertures at spaced locations therealong to enable attachment of the strip to the wall at locations adjacent the studs, and to also enable attachment of the mounting brackets to the wall. At least one row of openings 65 are provided in the strip 60 at spaced locations therealong, for example at locations spaced apart on one inch centers, and at a location intermediate the edge portions 61 and 62 to register with the aperture 49' in the stationary mounting bracket. In this manner, a screw 50 can be inserted through the aperture 49' in a stationary bracket member 33 of an upper mounting bracket 12' and through an aperture 65 in the strip 60 and into the wall W to enable direct attachment of the bracket members 12' to the wall. Selected ones of the apertures 65 that are located adjacent a stud in the wall can also be used to receive a strip fastening screw having a length to extend through the strip and the wall board or plaster into the stud in the wall. Additional apertures such as 66 arranged in a row offset toward the upper edge of the strip are also advantageously provided for receiving strip fastening screws 67 to attach the strip to the wall. Apertures 66 are conveniently longitudinally offset from the apertures 65 and, as shown, are located approximately medially between but spaced above the apertures 65.

FIGS. 9 and 10 to illustrate lower brackets 11' which are formed generally similar to the fixed brackets 11 but which are modified for attachment to the strips 61. As shown, brackets 11' have out-turned flanges 71' adjacent the rear edges of the side flanges 14', and the out-turned flanges 71' overlie the front side of the edge portions 61 and 62 of the strip and have in-turned flanges 72' and 73' at their upper and lower edges respectively that provide upper and lower inwardly opening grooves for slidably receiving the edge portions 61 and 62 of the strip. The aperture 19' for receiving the screw fastener 21 is positioned in the body portion 13' at a location to register with selected ones of the openings 65 so that screw fasteners 21 can be inserted through the aperture in the bracket member 11' and through a selected one of the apertures 65 in the strip and into the wall to directly mount the bracket members on the wall. Other ones of the openings 65 and/or 66 that are aligned with the studs in the wall can be utilized to receive strip attaching screws 68.

From the foregoing it is thought that the construction and operation of the mirror mounting brackets will be readily understood. The stationary and movable mounting bracket members 31 and 32 have guides adjacent opposite edges of the body portions 33 and 34 that slidably support the movable bracket member on the stationary bracket member with the body portions 33 and 34 laterally spaced apart to provide a cavity 35 therebetween. The single spring 45 is disposed in the cavity and extends crosswise of the path of travel and has its end portions attached to one of the body members and is engaged intermediate its ends by the other body member in such a manner that the spring is progressively distended as the movable body member is moved upwardly. The movable and stationary body members and spring can be easily assembled by first attaching the end loops of the spring to the ears 37a on the movable bracket member before the latter is assembled on the stationary bracket member. Spring 37 preferably has a length such that it can be attached to the ears 37a with only a slight distention sufficient to hold it on the ears during the subsequent assembly operation. Thereafter the movable body member is inserted into the lower end of the stationary body member and, as it is moved upwardly, the tab 33a engages the spring intermediate its ends to distend the spring as shown in FIGS. 2 and 3. Stop tabs 46 are thereafter bent forwardly to underlie the flanges 38 on the movable bracket member and limit downward movement of the same. As will be seen, the force applied by the spring 45 to the movable bracket member is symmetrical with respect to the vertical centerline of the movable bracket member so that the single spring does not tend to cause tilting or cocking of the movable bracket member as it slides relative to the stationary bracket member. Further, the spring 45 extends crosswise of the cavity at a location above the screw receiving apertures 49 so that is does not interfere with installation of the bracket mounting screw.

In the modification shown in FIGS. 7-11, the upper and lower mirror mounting brackets are attached to the wall means of mounting strips 60 and the mirror mounting brackets are slidable along the respective strip to enable positioning of the brackets at any desired location. The strips can be attached to the wall and to the studs in the wall at appropriate locations along the strip by strip mounting screws and the wall mounting brackets can be moved along the strip to the desired location and then directly attached to the wall by screws that extend through the mirror mounting brackets and strip and into the wall.

The embodiments of the invention in which an exclusive property or privilege is claimed are defined as follows:

1. A bracket for mounting an article such as a mirror on a supporting surface comprising: a stationary bracket member adapted for attachment to a wall and a movable bracket member having an integral mirror engaging hook, said bracket members each having a generally rectangular body portion and interfitting guides along opposite side edges of the body portions supporting the bracket members for relative sliding movement along a path paralleling the body portions with the body portions laterally spaced apart to provide a cavity therebetween, a spring member positioned in the cavity crosswise of said path and having end portions attached to one of the bracket members, a tab on the body portion of the other bracket member engaging the spring member intermediate its ends and arranged to progressively distend the spring member when the movable bracket member is moved in one direction relative to the stationary bracket member from a first to a second position, the body portion of the stationary bracket member having a screw receiving aperture substantially medially between the side edges thereof and spaced from said spring member, the movable bracket member having an opening dimensioned to allow the head of the screw to pass therethrough and adapted to register with the aperture in the stationary bracket member when the movable bracket member is in said first portion.

2. A bracket according to claim 1 wherein said means for attaching the stationary bracket member to a supporting surface includes an elongated mounting strip having relatively parallel lengthwise extending edge portions, said stationary bracket member having in-turned end flange portions at opposite ends of its body portion providing relatively parallel inwardly opening guide grooves at the rear side of the body portion slidably engaging said mounting strip along the edge portions thereof to enable adjustment of the bracket along the strip, said mounting strip having spaced screw receiving apertures therealong for mounting the strip on a wall.

3. A bracket according to claim 2 wherein the aperture in the body portion is adapted to register with at least some of the screw receiving apertures in the strip when the bracket is moved to different positions therealong.

4. A bracket for mounting an article such as a mirror on a supporting surface comprising: a stationary bracket member and a movable bracket member, one of said bracket members including a generally rectangular first body portion and in-turned flange portions along opposite side edges providing relatively parallel inwardly opening guide grooves at one side of the first body portion, the other of said bracket members including a generally rectangular second body portion and lateral flange portions extending laterally to one side of the second body portion along opposite side edges thereof and out-turned flange portions along the outer edges of the lateral flange portions, said out-turn flange portions extending generally parallel to said second body portion and guidably received in said guide grooves whereby said movable bracket member is slidable relative to said stationary bracket member along a path paralleling said guide grooves with said first and second body portions in spaced parallel relation, a spring member positioned between said first and second wall portions and having end portions engaging said lateral flange portions, said spring member extending between said lateral flange portions crosswise of said path, a spring engaging tab extending laterally from said first wall portion and engaging said spring member substantially medially between its ends to draw the intermediate portion of said spring member crosswise of its length and progressively distend the spring member when the movable bracket member is moved in one direction relative to the stationary bracket member from a first position to a second position, an article engaging hook at one end of said movable bracket member, and means for attaching the stationary bracket member to a supporting surface.

5. A bracket according to claim 4 wherein said spring member comprises a coil type spring having end portions thereof anchored to said lateral flange portions.

6. A bracket according to claim 4 wherein said lateral flange portions have spring anchor tabs adjacent one end, said spring member comprising a coil spring having end loops engaging said spring anchor tabs.

7. A bracket according to claim 4 wherein said means for attaching said stationary bracket member to a supporting surface includes a headed screw, a first aperture in said first body portion and a second aperture in said second body portion, said first and second apertures being located substantially medially between the side edges of the respective body portions and adapted to register when said movable bracket member is in said first position relative to said stationary bracket member, the aperture in the body portion of said stationary bracket member being dimensioned to allow only the shank of the headed screw to pass therethrough and the aperture in the body portions of said movable bracket member being sufficiently large to allow the head of the screw to pass therethough.

8. A bracket according to claim 7 including stop means on said movable and stationary bracket members engageable to limit movement in a direction opposite said one direction when said movable bracket member is in said first position relative to said stationary bracket member.

9. A bracket according to claim 4 including a first stop tab on said first body portion engageable with one end of the out-turned flange on said other bracket member to limit movement of said movable bracket member in a direction opposite said one direction when the movable bracket member reaches said first position.

10. A bracket according to claim 9 including a second stop tab on said lateral flange portions of said other bracket member and a shoulder on the in-turned flange on said one bracket member to limit movement of the movable bracket member in said one direction when the movable bracket member reaches said second position.

11. A bracket according to claim 4 wherein said one of said bracket members is the stationary bracket member and said other of said bracket members is the movable bracket member.

12. A bracket according to claim 4 wherein said means for attaching the stationary bracket member to a supporting surface includes an elongated mounting strip having relatively parallel lengthwise extending edge portions, said stationary bracket member having in-turned end flange portions at opposite ends of its body portion providing relatively parallel inwardly opening guide grooves at the rear side of the body portion slidably engaging said mounting strip along the edge portions thereof to enable adjustment of the bracket along the strip, said mounting strip having spaced fastener receiving apertures therealong for mounting the strip on a wall.

13. A bracket according to claim 4 wherein means for attaching said stationary bracket member to a supporting surface includes an elongated mounting strip having relatively parallel lengthwise extending edge portions and at least one row of screw receiving apertures intermediate said edge portions, said stationary bracket member having in-turned end flange portions at opposite ends of its body portion providing relatively parallel inwardly opening grooves at the other side of its body portion slidably engaging said mounting strip along the edge portions thereof to enable adjustment of the bracket along the strip, a first aperture in said first body portion and a second aperture in said second body portion, said first and second apertures being adapted to register with each other when said movable bracket member is in said first position relative to said stationary bracket member and adapted to register with different ones of the screw receiving openings in the strip when the bracket is moved to different positions therealong, the aperture in the body portion of the stationary bracket member being dimensioned to allow only the shank of a headed screw to pass therethrough and the aperture in the body portion of the movable bracket member being sufficiently large to allow the head of a screw to pass therethrough.

* * * * *

UNITED STATES PATENT AND TRADEMARK OFFICE
CERTIFICATE OF CORRECTION

PATENT NO. : 4,238,103
DATED : December 9, 1980
INVENTOR(S) : Thomas D. Kurtz

It is certified that error appears in the above-identified patent and that said Letters Patent are hereby corrected as shown below:

Claim 1, column 7, line 34, "portion" should be --position--.

Signed and Sealed this

Seventeenth Day of March 1981

[SEAL]

Attest:

RENE D. TEGTMEYER

Attesting Officer     Acting Commissioner of Patents and Trademarks